United States Patent [19]
Craig

[11] Patent Number: 6,156,112
[45] Date of Patent: Dec. 5, 2000

[54] HIGH SOLIDS AQUEOUS DISPERSIONS OF REACTIVE HYDROPHOBIZING AGENTS

[76] Inventor: Daniel H. Craig, 1516 Valencia Rd., Schenectady, N.Y. 12309

[21] Appl. No.: 09/248,124

[22] Filed: Feb. 10, 1999

Related U.S. Application Data

[60] Provisional application No. 60/074,532, Feb. 12, 1998.
[51] Int. Cl.$^7$ .................................. C09D 7/07; C09D 7/12
[52] U.S. Cl. ............................ 106/217.7; 106/174.1; 106/184.1; 106/209.1; 106/215.4; 106/217.5; 524/27; 524/46; 524/47; 524/107; 524/321
[58] Field of Search ................... 106/174.1, 184.1, 106/209.1, 215.4, 217.5, 217.7; 524/27, 46, 47, 107, 321

[56] References Cited

U.S. PATENT DOCUMENTS

| | | |
|---|---|---|
| 2,627,477 | 2/1953 | Downey . |
| 3,432,319 | 3/1969 | Jakaltis et al. . |
| 3,931,069 | 1/1976 | Lundin . |
| 4,296,012 | 10/1981 | Okumichi et al. . |
| 5,013,775 | 5/1991 | Oikawa et al. . |
| 5,028,236 | 7/1991 | Kortmann et al. . |
| 5,403,392 | 4/1995 | Craig . |
| 5,658,377 | 8/1997 | Craig . |

*Primary Examiner*—David Brunsman

[57] ABSTRACT

This invention relates to high solids aqueous dispersions of reactive hydrophobizing agents, to methods of preparation of such dispersions, and to aqueous blends of such dispersions with a variety of other aqueous dispersions or solutions, including synthetic resin emulsions, wherein the aqueous dispersions of reactive hydrophobizing agents are prepared in the presence of a water-soluble protective colloid in combination with a solid water-insoluble anhydride compound. The dispersions of this invention efficiently impart hydrophobic characteristics to the surfaces and interfaces of materials onto which they are applied and unexpectedly exhibit very high stability to storage and handling conditions found in industry.

20 Claims, No Drawings

HIGH SOLIDS AQUEOUS DISPERSIONS OF REACTIVE HYDROPHOBIZING AGENTS

This application claims priority of U.S. Provisional Application Ser. No. 60/074,532, Feb. 12, 1998, "High Solids Aqueous Dispersions of Reactive Hydrophobizing Agents", Daniel H. Craig, Applicant.

This invention relates to high solids aqueous dispersions of reactive hydrophobizing agents, to high solids aqueous dispersions containing blends of reactive hydrophobizing agents with nonreactive hydrophobizing agents, to methods of preparation of such dispersions, and to aqueous blends of such dispersions with a variety of other aqueous dispersions or solutions, including synthetic resin emulsions. The high solids dispersions of this invention efficiently impart hydrophobic characteristics to the surfaces and interfaces of materials onto which they are applied and unexpectedly exhibit very high stability to storage and handling conditions found in industry.

BACKGROUND OF INVENTION

Hydrophobizing agents are widely used to impart water resistance to such compositions as textiles, carpet fibers, paper and paperboard, when applied thereon. Many materials are known in the art to be useful as hydrophobizing agents for water repellency applications, including organometallic complexes, waxes and wax-metal emulsions, resin-based finishes, silicones, rosin, alkylketene dimers, and fluoro chemicals. A general review of the many uses and types of water repellent chemicals, useful as hydrophobizing agents, is provided by M. Hayek in the *Encyclopedia of Chemical Technology,* Volume 24, (1984), "Waterproofing and Water/Oil Repellency", pages 442 through 465, and is incorporated herein by reference.

It is well known in the art that many hydrophobizing agents can be stabilized in aqueous dispersion form by the presence of surfactants, usually fatty acid salts, or salts of sulfated fatty alcohols, in order to facilitate their handling and application onto materials, especially at surfaces or at interfaces, for the purpose of imparting water repellency. Such dispersions contain relatively high concentrations of surfactant and/or protective colloids as dispersion stabilizers, typically greater than 10% by weight based on hydrophobizing agent, the presence of which, while providing the necessary colloidal stability for practical preparation of such aqueous dispersions, and providing the necessary surface activity to ensure deposition of the hydrophobizing agent at surfaces or interfaces, can detract from the repellency properties desired upon final application. This results from the presence of the usually hygroscopic surfactant or protective colloid in the resulting water repellent layer, which can promote rewetting and swelling of the deposited hydrophobizing agent in the presence of water or water vapor.

In the case of reactive hydrophobizing agents, such as fatty acid anhydrides, alkylketene dimers, and alkenylsuccinic anhydrides, or blends of reactive hydrophobizing agents with themselves or with nonreactive hydrophobizing agents, wherein covalent bonds with active hydrogen-containing groups on the surface of substrates can be formed to provide an enhanced hydrophobizing effect, the high levels of dispersion stabilizers required for colloidal stability can interfere with the covalent reactions anchoring the repellent to the substrate by competing with the substrate for active sites, lessening the hydrophobizing effect. Reaction of the reactive hydrophobizing agent with water itself also poses significant problems in designing stable dispersions of such materials. In addition, the high levels of emulsifiers can serve to increase the rate of the hydrolysis side reaction, resulting in dispersions of limited shelf life.

In the case of crystalline reactive hydrophobizing agents or blends of crystalline reactive hydrophobizing agents with themselves or with crystalline or amorphous hydrophobizing agents such as the various natural, mineral, and synthetic waxes, and fatty triglycerides, substantially higher levels of dispersion stabilizer are frequently required to offset the pronounced negative effect the presence of the crystalline hydrophobizing agent has on dispersion stability. Indeed, it is known that incorporation of even low levels of crystalline hydrophobizing agents into aqueous dispersions frequently causes a dispersion of amorphous hydrophobizing agent to gel upon standing. Thus shipping, storage, and handling requirements require that high levels of dispersion stabilizer be used to ensure sufficient colloidal stability to prevent dispersion flocculation, viscosity build, and eventual gelation or solidification. Nevertheless, crystalline hydrophobizing agents, and crystalline reactive hydrophobizing agents in particular, provide a high degree of water repellency and it is frequently a goal of manufacturers of hydrophobizing agent dispersions to blend crystalline hydrophobizing agents or crystalline reactive hydrophobizing agents with less costly crystalline or amorphous hydrophobizing agents to achieve a proper balance of economics and high performance. It is therefore desirable to minimize the presence of dispersion stabilizing additives, such as surfactants or protective colloids, in the final reactive hydrophobizing agent dispersion, in order to achieve the greatest efficiency of active ingredient utilization.

One method for providing such colloidal stability, in addition to the aforementioned use of high levels of surfactants, has been to prepare the dispersions in relatively dilute form, usually less than 10% to 20%, by weight based on total dispersion, of reactive hydrophobizing agent or reactive hydrophobizing agent blend. While this may provide sufficient stability for many applications, it can also lead to inefficiencies in storage and shipping since the corresponding quantity of water becomes excessively large, requiring surplus storage facilities and shipping containers for what amounts to low levels of useful or active ingredient. It is therefore also desirable to maximize the concentration of reactive hydrophobizing agent or reactive hydrophobizing agent blend in the dispersion, to provide the greatest efficiency of storage and to minimize transportation costs.

Numerous patents have been obtained disclosing methods for improving the colloidal stability, i.e. storage and handling stability, of dispersions containing reactive hydrophobizing agents. Thus U.S. Pat. No. 4,296,012 describes a method of utilizing a non-crystalline hydrocarbon resin in combination with a crystalline ketene dimer in order to achieve the appropriate amount of stability in the corresponding aqueous ketene dimer dispersion, while providing a high degree of sizing effect. However, the dispersions are relatively dilute, typically 15% by weight of total dispersion of non-volatile component and contain a high concentration of dispersion stabilizer, typically greater than 20% by weight based on concentration of hydrophobizing agent.

A combination of a cationic dispersing agent and alkyl hydroxyalkyl cellulose, as dispersion stabilizers for substituted ketene dimer dispersions, is disclosed in U.S. Pat. No. 3,931,069. The dispersions are useful for sizing cellulose fibers and contain up to 30%, by weight, of total solids content, of which the ketene dimer content is substantially less than 30% by weight.

Furthermore, it had been disclosed and claimed in U.S. Pat. No. 2,627,477 aqueous emulsions of higher ketene dimers, containing a water-soluble cellulose ether, useful in sizing paper. However the examples teach that very high levels of water-soluble cellulose ether relative to ketene dimer, up to as much as 300% or greater by weight of stabilizer based on ketene dimer, must be employed. The resulting dispersions themselves are very dilute, typically 0.5% by weight of ketene dimer based on total dispersion.

U.S. Pat. No. 5,013,775 discloses the difficulty associated with preparation of stable high concentration aqueous dispersion sizing agents based on ketene dimer compounds and suggests a solution whereby a composition comprising a hydrophilic copolymer polymerized in the presence of an alkylmercaptan is utilized to stabilize the hydrophobic ketene dimer compounds in aqueous dispersion form. The resulting dispersions typically contain about 20% solids by weight of total dispersion and 20% dispersion stabilizer by weight of ketene dimer.

U.S. Pat. No. 5,028,236 describes ketene dimer dispersions useful for the treatment of wool and synthetic polyamide fibers. The dispersions of said invention are less than about 10%, by weight of total dispersion, of hydrophobizing agent.

U.S. Pat. No. 5,403,392 describes high solids dispersions of hydrophobizing agents stabilized in aqueous dispersion form by plant glycosides. The dispersions of said patent are stable upon storage at ambient conditions and achieve hydrophobizing agent concentrations of up to about 40% by weight of total dispersion.

U.S. Pat. No. 5,658,377 describes high solids dispersions of hydrophobizing agents produced utilizing water-soluble protective colloids in combination with hydrolytically stable water-insoluble organic compounds selected from the group comprising organic salts and polar group-containing organic compounds. The dispersions of said patent are stable upon storage at ambient conditions and achieve hydrophobizing agent concentrations of up to about 50% by weight of total dispersion.

From the related field of nonreactive wax emulsions, several other U.S. patents describe methods of producing high solids wax dispersions. For instance, U.S. Pat. No. 2,172,392 discloses stable high solids wax emulsions produced in the presence of high levels of protein materials such as casein. Salts such as sodium carbonate are used to solubilize the protein materials in water via ionization of their carboxyl groups, enabling the protein's emulsifying properties to be manifested. Very high levels of emulsifier are used to achieve the desired effect.

U.S. Pat. No. 2,536,018 relates to aqueous polyvinyl acetate coating compositions modified by blending with wax emulsions to achieve improvements in wear resistance to objects coated therewith. Wax emulsions stabilized with fatty acid soaps are described.

U.S. Pat. No. 2,658,004 describes blends of wax emulsions and mica dispersions useful as last slips. No special requirements concerning the manufacture of the wax emulsion component nor of the mica dispersion component of the resulting blend are disclosed.

U.S. Pat. No. 3,432,319 discloses paraffin wax emulsion compositions comprising relatively low concentrations of a hydroxyalkyl methylcellulose ether dispersion stabilizer. Several advantages associated with the absence of conventional surfactants and the use of high aqueous concentrations of wax are disclosed, including increased mechanical shear stability and increased compatibility with urea-formaldehyde resins. However the hydrophobizing wax material is restricted to paraffin wax.

Finally, a detailed description of the complex considerations necessary in the design of stable industrial emulsions, including wax emulsions, is provided by W. C. Griffin in the *Encyclopedia of Chemical Technology*, Volume 8, (1979), "Emulsions", pages 900 through 930. This reference discloses that wax emulsions, i.e. dispersions, may be stabilized against agglomeration by buffering with an organic ester, although no details are given.

None of the aforementioned references describe the unique ability to simultaneously achieve aqueous emulsions which possess high reactive hydrophobizing agent or reactive hydrophobizing agent blend concentrations, low emulsifier content, high emulsion stability, and which impart enhanced water repellency characteristics to substrates according to the instant invention.

DESCRIPTION OF INVENTION

It is an object of this invention to provide aqueous dispersions of reactive hydrophobizing agents containing low levels of dispersion stabilizers relative to the concentration of hydrophobizing agent, to allow for increased efficacy of the reactive hydrophobizing agent in its end use application. It is further an object of this invention to provide stable high solids aqueous dispersions of reactive hydrophobizing agents for the purpose of minimizing secondary costs and inefficiencies associated with dilute dispersions, such as shipping and storage costs, and for maximizing dispersion stability under thermal cycling conditions typically encountered by current commercially available reactive hydrophobizing agent dispersions during transport and storage. It is further an object of this invention to provide aqueous dispersions of reactive hydrophobizing agents wherein the hydrophobizing agent can be a blend of different reactive hydrophobizing agents or a blend of reactive hydrophobizing agents with other hydrophobizing agents, including nonreactive hydrophobizing agents. It is further an object of this invention to provide aqueous dispersions of reactive hydrophobizing agents which are compatible when mixed with synthetic resin emulsions or hydrophobizing agent dispersions of different composition. Lastly, it is an object of this invention to provide methods for producing such reactive hydrophobizing agent dispersions. These and other aspects of the present invention will be made obvious to those skilled in the art from the detailed description provided below.

It has been discovered that stable high solids aqueous dispersions of reactive hydrophobizing agents can be prepared utilizing a water-soluble protective colloid in combination with a solid water-insoluble anhydride compound. These dispersions are stable to storage and pumping, unexpectedly possess remarkable stability to thickening, solidification or coagulation at storage temperatures above 30° C., especially under thermal cycling conditions between ambient temperatures and 34° C.; temperature conditions known in the art to pose particular stability problems for dispersions containing reactive hydrophobizing agents, and known to be frequently encountered during commercial shipment and storage of such reactive hydrophobizing agent dispersions, and can be produced at reactive hydrophobizing agent concentrations of up to 50% or greater, by weight based on total dispersion.

These dispersions typically contain from about 0.05% by weight of hydrophobizing agent up to about 10% by weight based on hydrophobizing agent of water-soluble protective colloid, more preferably from about 0.25% by weight of hydrophobizing agent up to about 7.5% by weight based on hydrophobizing agent of water-soluble protective colloid, most preferably from about 0.3% to about 5% by weight of hydrophobizing agent of water-soluble protective colloid, and a solid water-insoluble anhydride compound, in a ratio to hydrophobizing agent, by weight, of about 0.1:99.9 to about 99.9:0.1; more preferably a solid water-insoluble anhydride compound to hydrophobizing agent ratio, by weight, of about 0.5:99.5 to about 1:1; most preferably a solid, high melting, water-insoluble anhydride compound to hydrophobizing agent ratio, by weight, of about 1:99 to about 1:3.

The low concentration of water-soluble protective colloid utilized according to this invention helps to provide a dispersion which is efficient in imparting hydrophobic characteristics to substrates, by reducing rewetting of the protective hydrophobic layer and by minimizing competing side reactions. The presence of the solid water-insoluble anhydride compound, in addition to increasing the stability of the dispersion at significantly higher total dispersion solids relative to dispersions of the prior art, further enhances the ability of the dispersion to impart hydrophobic characteristics to substrates when compared to similar dispersions made in the absence of the solid water-insoluble anhydride compound.

A wide range of water-soluble protective colloid dispersion stabilizers are useful for the instant invention, such as the natural or semi-synthetic water-soluble gums or resins, descriptions of which are provided by Cottrell and Baird, in *Encyclopedia of Chemical Technology*, Volume 12, (1980), "Gums", pages 45 through 66, and by A. S. Teot in *Encyclopedia of Chemical Technology*, Volume 20, (1982), "Resins, Water-Soluble", pages 207 through 230, the contents of which are incorporated herein by reference, and water-soluble addition polymers and copolymers of vinyl monomers. Preferred are natural or semi-synthetic carbohydrate-based protective colloids, such as those selected from the group comprising plant glycosides, including glycosides whose aglycone portion is structurally related to benzopyrone-, triterpenoid-, and steroid-based structures, and natural or semi-synthetic water-soluble polysaccharides, including starches and modified starches, water-soluble cellulose ethers, such as methyl cellulose, methyl hydroxypropyl cellulose and hydroxypropyl cellulose, and combinations of said water-soluble protective colloids with each other and with other water-soluble polymers. Most preferred are plant glycosides, water-soluble cellulose ethers, modified starches, and combinations thereof.

The solid water-insoluble anhydride compounds useful in the dispersions of the instant invention are those normally solid anhydride group-containing organic compounds whose solubility in water at room temperature is less than about 0.1% by weight based on total solution. Typical examples include those solid water-insoluble anhydride compounds selected from the group comprising copolymers containing one or more of maleic anhydride, itaconic anhydride, acrylic anhydride, and methacrylic anhydride, as well as organic anhydride compounds as exemplified by benzophenonetetracarboxylic dianhydride and benzoic anhydride, and adducts of maleic anhydride with olefin compounds. Preferred are maleic anhydride copolymers, organic anhydride compounds, and adducts of maleic anhydride with olefin compounds. Most preferred are styrene-maleic anhydride copolymers and organic anhydride compounds.

It is well known in the art to utilize combinations of dispersion stabilizers in order to fine tune the characteristics of the resulting aqueous dispersion for viscosity and ease of application. Thus, the present invention contemplates also the use of combinations of water-soluble protective colloids with secondary dispersion stabilizers, such as traditional surfactants known in the art, including anionic, cationic, nonionic, and amphoteric surfactants, as well as water-soluble thickeners and rheology modifiers, in order to modify the rheological characteristics of the dispersion, as well as to minimize the concentration of required primary stabilizer necessary to achieve the required dispersion stability.

Reactive hydrophobizing agents contemplated by the present invention are those compounds selected from the group comprising alkylketene dimers, carboxylic acid anhydrides, alkenylsuccinic anhydrides, alkylsuccinic anhydrides, epoxides, acid chlorides, and isocyanates, which provide some lasting degree of water repellency when applied under ambient conditions to the surface or available interfaces of a given material, and blends of said reactive hydrophobizing agents with each other. Preferred are alkylketene dimers, alkylsuccinic anhydrides, and fatty acid anhydrides and blends of such reactive hydrophobizing agents with other hydrophobizing agents.

Nonreactive hydrophobizing agents can be readily blended with said reactive hydrophobizing agents according to the instant invention. This provides an advantage over reactive hydrophobizing agent dispersions of the prior art, which typically do not tolerate the presence of nonreactive hydrophobizing agents to any significant degree, by allowing the fine tuning of characteristics of the hydrophobizing agent, such as its melting point, melt rheology, and substrate substantivity. Examples of nonreactive hydrophobizing agents include materials such as triglycerides, especially normally solid or semi-solid triglycerides such as those derived from animal and plant sources, including triglycerides derived from the following fatty acids, lauric, myristic, palmitic, stearic, oleic, linoleic, linolenic, alpha-eleostearic, ricinoleic, behenic, erucic, as well as triglyceride derivatives including hydrogenated triglycerides or saturated triglycerides such as trilaurin, tripalmitin, trimyristin, tristearin, and castor wax, additional examples of which are contained in *Encyclopedia of Chemical Technology*, Volume 9, (1980), "Fats and Fatty Oils", by T. Applewhite, pages 795 through 831, incorporated herein by reference; waxes, i.e. materials which are plastic solids at room temperature, but yield low viscosity fluids upon melting, and which may be crystalline or amorphous, comprising such materials as insect and animal waxes including beeswax and spermaceti, vegetable waxes including candelilla wax, carnauba wax, castor wax, and bayberry wax, mineral waxes including montan wax and petroleum waxes, synthetic waxes such as polyethylene or polyolefin waxes and carboxylated polyethylene waxes, and other hydrophobic materials such as fatty acids, fatty alcohols, fatty acid esters, rosin acids and rosin acid esters, many of these examples being described in *Encyclopedia of Chemical Technology*, Volume 24, (1984), "Waxes", by C. S. Letcher, pages 466 through 481, incorporated herein by reference; hydrogenated aromatic petroleum hydrocarbon resin, petrolatum, petroleum asphalt, petroleum alicyclic hydrocarbon resins, and polyethylene-maleic anhydride adducts.

Useful hydrophobizing agent concentrations are from about 0.1% by weight based on total dispersion to about 60% by weight. Preferred concentrations are from about 1% to about 50% by weight. Most preferred are concentrations between about 10% to about 40% by weight.

Several unexpected but especially useful advantages accrue from the dispersions of the instant invention. First, stable high solids dispersions of reactive crystalline alkylketene dimers can be produced according to the instant invention; something which has heretofore been difficult to achieve, especially at the low levels of dispersion stabilizer utilized according to the instant invention. Second, stable high solids dispersions of blends of alkylketene dimers with other hydrophobizing agents, especially crystalline hydrophobizing agents, can be produced according to the instant invention at a wide range of hydrophobizing agent ratios, providing an opportunity to fully exploit the properties of various combinations of hydrophobizing agents to achieve optimized water repellency for a wide range of substrates. Indeed, in the few instances where alkylketene dimers have been disclosed as being combined with other hydrophobic materials in an aqueous dispersion, only certain non-crystalline hydrophobizing agents have been blended with the ketene dimers, as disclosed in U.S. Pat. No. 4,296,012, or only very dilute dispersions can be produced in the case of crystalline materials, such as those compositions assigned to Kao Soap Co., Ltd., in Japanese patents JP 82,101,095; JP 82,101,096; JP 82,112,498; JP 82,112,499; JP 83,087,395; JP 83,087,396; JP 83,091,894; JP 83,091,895; described in Chemical Abstracts CA:97:218355u, CA:97:218356v, CA:98:5658d, CA:98:5659e, CA:99:214418k, CA:99:214402a, CA:99:196885d, CA:99:196886e, respectively, incorporated herein by reference; which patents disclose dispersions containing 90.9/9.1 blends of alkylketene dimer with propylene glycol monostearate, sucrose stearate, zinc stearate, tristearin, rice-bran wax, 1,4-butanediol distearate, ethylene glycol distearate, pentaerythritol tetrastearate, respectively, containing about 13% by weight of total dispersion of the blend of hydrophobizing agents, wherein the second component blended with the ketene dimers constitutes about nine percent of the hydrophobizing agent blend, and wherein the dispersion stabilizer, a surfactant, is utilized at a concentration of about 27% by weight of hydrophobizing agent blend. Third, the dispersions of the instant invention provide unexpected increases in the water repellency characteristics imparted to substrates upon application thereto. Thus it has been found that decreased concentrations of the dispersions of the instant invention are required in order to achieve acceptable substrate water repellency characteristics.

The dispersions of this invention further display a high degree of compatibility with other aqueous systems and are readily mixed with synthetic resin dispersions, without loss of stability of the resulting blend. A review of the many types and applications of synthetic resin emulsions, i.e. dispersions, is provided by H. Warson, in *The Applications of Synthetic Resin Emulsions,* Ernest Benn Limited, London, (1972). Thus it is often desirable to modify the properties of synthetic resin dispersions with aqueous dispersions of waxes in order to achieve a specific end use property. An example is the known modification of polyvinylidene chloride dispersions with wax emulsions, in order to achieve a lower coefficient of friction and anti-blocking properties in films coated with the polyvinylidene chloride, for use as snack food packaging. Another example is the modification of paper size dispersions with cationic retention aids, in order to further facilitate the incorporation of the size dispersion onto cellulose fibers. Frequently, dispersions based on fatty acid surfactants or standard fatty alcohol sulfates coagulate in the presence of these cationic resins. Dispersions made according this invention are compatible with aqueous solutions of cationic resins, affording stable mixtures which can be readily applied for sizing purposes.

The following examples serve to illustrate specific aspects of the instant invention without intending to limit the scope of what is claimed. All portions described below are by weight.

EXAMPLE 1

3.0 parts methyl cellulose (2% aqueous solution viscosity 15 cps) predissolved in 350 parts distilled water, 5.0 parts styrene-maleic anhydride copolymer resin (SMA-1000, fine powder form, Elf Atochem), predispersed in said aqueous solution, and 240 parts hexadecylketene dimer (melting range 50° C. to 53° C.) were mixed and heated to 55° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion containing 40.1% by weight of total dispersion of hexadecylketene dimer. The dispersion was indefinitely stable to storage at room temperature without visible change in appearance or fluidity and was stable to thermal cycling between 34° C. and 2° C. (12 hours at each temperature) for more than ten cycles without loss of fluidity. A control dispersion produced according to the above recipe, but in the absence of styrene-maleic anhydride copolymer resin, yielded an aqueous dispersion which was stable to storage at room temperature but solidified during the fourth thermal cycle. Attempts to produce a control dispersion according to the above recipe, but in the absence of the methyl cellulose, resulted in incomplete emulsification of the hexadecylketene dimer. Attempts to produce a control dispersion according to the above recipe, but in the absence of both the methyl cellulose and the styrene-maleic anhydride copolymer resin, resulted in incomplete emulsification of the hexadecylketene dimer. This example illustrates an embodiment of the instant invention wherein a nonionic dispersion of the instant invention is produced in the presence of a water-soluble polysaccharide and exhibits enhanced stability.

EXAMPLE 2

2.0 parts methyl cellulose (2% aqueous solution viscosity 15 cps), and 1.0 part sodium salt of sulfonated naphthalene-formaldehyde condensate predissolved in 350 parts distilled water, 5.0 parts styrene-maleic anhydride copolymer resin (SMA-1000, fine powder form, Elf Atochem), predispersed in said aqueous solution, and 240 parts hexadecylketene dimer (melting range 50° C. to 53° C.) were mixed and heated to 55° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion containing 40.1% by weight of total dispersion of hexadecylketene dimer. The dispersion was indefinitely stable to storage at room temperature without visible change in appearance or fluidity and was stable to thermal cycling between 34° C. and 2° C. (12 hours at each temperature) for more than ten cycles without loss of fluidity. A control dispersion produced according to the above recipe, but in the absence of styrene-maleic anhydride copolymer resin, yielded an aqueous dispersion which was stable to storage at room temperature but solidified during the sixth thermal cycle. A control dispersion produced according to the above recipe, but in the absence of the methyl cellulose, yielded an aqueous dispersion which solidified after storage at room temperature for three days. A control dispersion produced according to the above recipe, but in the absence of both the methyl cellulose and the styrene-maleic anhydride copolymer resin, yielded an aqueous dispersion which solidified after storage at room temperature for one day. This example illustrates an embodiment of the instant invention wherein a dispersion of the instant invention is produced in the presence of a water-soluble polysaccharide and an optional anionic surfactant, and exhibits enhanced stability.

EXAMPLE 3

2.0 parts methyl cellulose (2% aqueous solution viscosity 15 cps), 10.0 parts cationic starch (Cato 237, National Starch Corp.), and 1.0 part sodium salt of sulfonated naphthalene-formaldehyde condensate predissolved in 340 parts distilled water, 5.0 parts styrene-maleic anhydride copolymer resin (SMA-1000, fine powder form, Elf Atochem), predispersed in said aqueous solution, and 240 parts hexadecylketene dimer (melting range 50° C. to 53° C.) were mixed and heated to 55° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion containing 40.1% by weight of total dispersion of hexadecylketene dimer. The dispersion was indefinitely stable to storage at room temperature without visible change in appearance or fluidity and was stable to thermal cycling between 34° C. and 2° C. (12 hours at each temperature) for more than ten cycles without loss of fluidity. A control dispersion produced according to the above recipe, but in the absence of styrene-maleic anhydride copolymer resin, yielded an aqueous dispersion which was stable to storage at room temperature but solidified during the fourth thermal cycle. A control dispersion produced according to the above recipe, but in the absence of the methyl cellulose, yielded an aqueous dispersion which solidified after storage at room temperature for three days. A control dispersion produced according to the above recipe, but in the absence of both the methyl cellulose and the styrene-maleic anhydride copolymer resin, yielded an aqueous dispersion which solidified after storage at room temperature for one day. This example illustrates an embodiment of the instant invention wherein a dispersion of the instant invention is produced in the presence of a water-soluble polysaccharide, in addition to an optional anionic surfactant and an optional cationic starch, is cationically charged, and exhibits enhanced stability.

EXAMPLE 4

5.0 parts Saponin Quillaia extract, and 10.0 parts cationic starch (Cato 237, National Starch Corp.) predissolved in 350 parts distilled water, 5.0 parts styrene-maleic anhydride copolymer resin (SMA-1000, fine powder form, Elf Atochem), predispersed in said aqueous solution, and 240 parts hexadecylketene dimer (melting range 50° C. to 53° C.) were mixed and heated to 55° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion containing 39.3% by weight of total dispersion of hexadecylketene dimer. The dispersion was indefinitely stable to storage at room temperature without visible change in appearance or fluidity and was stable to thermal cycling between 34° C. and 2° C. (12 hours at each temperature) for more than 10 cycles without loss of fluidity. A control dispersion produced according to the above recipe, but in the absence of styrene-maleic anhydride copolymer resin, yielded an aqueous dispersion which was stable to storage at room temperature but solidified during the sixth thermal cycle. A control dispersion produced according to the above recipe, but in the absence of the Saponin Quillaia, yielded an aqueous dispersion which solidified after storage at room temperature for one day. A control dispersion produced according to the above recipe, but in the absence of both the Saponin Quillaia and the styrene-maleic anhydride copolymer resin, yielded an aqueous dispersion which solidified as it cooled to room temperature. This example illustrates an embodiment of the instant invention wherein a dispersion of the instant invention is produced in the presence of a plant glycoside and exhibits enhanced stability.

EXAMPLE 5

2.5 parts methyl cellulose (2% aqueous solution viscosity 15 cps), 10.0 parts cationic starch (Cato 237, National Starch Corp.), 1.0 part sodium salt of sulfonated naphthalene-formaldehyde condensate predissolved in 340 parts distilled water, 60 parts styrene-maleic anhydride copolymer resin (SMA-1000, fine powder form, Elf Atochem), predispersed in said aqueous solution, and 180 parts hexadecylketene dimer (melting range 50° C. to 53° C.) were mixed and heated to 55° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion containing 30.3% by weight of total dispersion of hexadecylketene dimer and 10.1% by weight of total dispersion of styrene-maleic anhydride copolymer resin. The dispersion was indefinitely stable to storage at room temperature without visible change in appearance or fluidity and was stable to thermal cycling between 34° C. and 2° C. (12 hours at each temperature) for more than ten cycles without loss of fluidity. A control dispersion produced according to the above recipe, but in the absence of styrene-maleic anhydride copolymer resin, yielded an aqueous dispersion which was stable to storage at room temperature but solidified during the fifth thermal cycle. A control dispersion produced according to the above recipe, but in the absence of the methyl cellulose, yielded an aqueous dispersion which solidified after storage at room temperature for seven days. A control dispersion produced according to the above recipe, but in the absence of both the methyl cellulose and the styrene-maleic anhydride copolymer resin, yielded an aqueous dispersion which solidified after storage at room temperature for three days. This example illustrates an embodiment of the instant invention wherein a dispersion of the instant invention contains a high concentration of solid water-insoluble anhydride compound.

EXAMPLE 6

2.0 parts methyl cellulose (2% aqueous solution viscosity 15 cps), 10.0 parts cationic starch (Cato 237, National Starch Corp.), 0.5 part sodium salt of sulfonated naphthalene-formaldehyde condensate predissolved in 340 parts distilled water, 5.0 parts styrene-maleic anhydride copolymer resin (SMA-1000, fine powder form, Elf Atochem), predispersed in said aqueous solution, and 300 parts hexadecylketene dimer (melting range 50° C. to 53° C.) were mixed and heated to 55° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion containing 45.6% by weight of total dispersion of hexadecylketene dimer. The dispersion was indefinitely stable to storage at room temperature without visible change in appearance or fluidity and was stable to thermal cycling between 34° C. and 2° C. (12 hours at each temperature) for four cycles without loss of fluidity. A control dispersion produced according to the above recipe, but in the absence of styrene-maleic anhydride copolymer resin, yielded an aqueous dispersion which was stable to storage at room temperature but solidified during the first thermal cycle. A control dispersion produced according to the above recipe, but in the absence of the methyl cellulose, yielded an aqueous dispersion which solidified after cooling to room temperature. A control dispersion produced according to the above recipe, but in the absence of both the methyl cellulose and the styrene-maleic anhydride copolymer resin, yielded an aqueous dispersion which solidified after cooling to room temperature. This example illustrates an embodiment of the instant invention wherein the dispersions of the instant invention contain a very high concentration of hexadecylketene dimer.

EXAMPLE 7

5.0 parts methyl cellulose (2% aqueous solution viscosity 15 cps), 10.0 parts cationic starch (Cato 237, National Starch Corp.), 0.5 part sodium salt of sulfonated naphthalene-formaldehyde condensate predissolved in 350 parts distilled water, 5.0 parts styrene-maleic anhydride copolymer resin (SMA-1000, fine powder form, Elf Atochem), predispersed in said aqueous solution, 180 parts paraffin wax (melting point 157° F.), and 60 parts hexadecylketene dimer (melting range 50° C. to 53° C.) were mixed and heated to 65° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion containing 39.3% by weight of total dispersion of a hydrophobizing agent blend which is 75% by weight paraffin wax and 25% by weight alkylketene dimer wax. The dispersion was indefinitely stable to storage at room temperature without visible change in appearance or fluidity and was stable to thermal cycling between 34° C. and 2° C. (12 hours at each temperature) for five cycles without loss of fluidity. A control dispersion produced according to the above recipe, but in the absence of styrene-maleic anhydride copolymer resin, yielded an aqueous dispersion which was stable to storage at room temperature but solidified during the third thermal cycle. A control dispersion produced according to the above recipe, but in the absence of the methyl cellulose, yielded an aqueous dispersion which solidified after cooling to room temperature. A control dispersion produced according to the above recipe, but in the absence of both the methyl cellulose and the styrene-maleic anhydride copolymer resin, yielded an aqueous dispersion which solidified after cooling to room temperature. This example illustrates an embodiment of the instant invention wherein a dispersion of the instant invention contains a blend of alkylketene dimer with a high proportion of nonreactive wax (i.e., paraffin wax).

EXAMPLE 8

5.0 parts methyl cellulose (2% aqueous solution viscosity 15 cps), 10.0 parts cationic starch (Cato 237, National Starch Corp.), 0.5 part sodium salt of sulfonated naphthalene-formaldehyde condensate predissolved in 350 parts distilled water, 5.0 parts styrene-maleic anhydride copolymer resin (SMA-1000, fine powder form, Elf Atochem), predispersed in said aqueous solution, 60 parts paraffin wax (melting point 157° F.), and 180 parts hexadecylketene dimer (melting range 50° C. to 53° C.) were mixed and heated to 65° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion containing 39.3% by weight of total dispersion of a hydrophobizing agent blend which is 25% by weight paraffin wax and 75% by weight alkylketene dimer wax. The dispersion was indefinitely stable to storage at room temperature without visible change in appearance or fluidity and was stable to thermal cycling between 34° C. and 2° C. (12 hours at each temperature) for ten cycles without loss of fluidity. A control dispersion produced according to the above recipe, but in the absence of styrene-maleic anhydride copolymer resin, yielded an aqueous dispersion which was stable to storage at room temperature but solidified during the fifth thermal cycle. A control dispersion produced according to the above recipe, but in the absence of the methyl cellulose, yielded an aqueous dispersion which solidified after cooling to room temperature. A control dispersion produced according to the above recipe, but in the absence of both the methyl cellulose and the styrene-maleic anhydride copolymer resin, yielded an aqueous dispersion which solidified after cooling to room temperature. This example illustrates an embodiment of the instant invention wherein a dispersion of the instant invention contains a blend of alkylketene dimer with a small proportion of nonreactive wax (i.e., paraffin wax).

EXAMPLE 9

3.0 parts methyl cellulose (2% aqueous solution viscosity 15 cps) predissolved in 350 parts distilled water, and 240 parts hexadecylketene dimer (melting range 50° C. to 53° C.) were mixed and heated to 55° C. with agitation, homogenized via ultrasonic treatment at 375 watts for 50 seconds, utilizing a Cole-Parmer High Intensity Ultrasonic Processor (final dispersion temperature ~70° C.), then cooled rapidly to room temperature with constant agitation. The mixture was filtered yielding a homogeneous, fluid, aqueous dispersion. To this dispersion was added 5.0 parts finely ground benzoic anhydride, with low shear mixing at room temperature. The resulting dispersion is indefinitely stable to storage at room temperature without visible change in appearance or fluidity and stable to thermal cycling between 34° C. and 2° C. (12 hours at each temperature) for more than ten cycles without loss of fluidity. This example illustrates an embodiment of the instant invention wherein the solid water-insoluble anhydride compound is an organic anhydride.

EXAMPLE 10

3 parts of the dispersion described in Example 2 were mixed with 100 parts of a 50% aqueous dispersion of vinylidene chloride/methyl methacrylate copolymer with slow stirring. The blend was stable to storage and could be readily coated onto polyolefin film. This example illustrates the compatibility of the dispersions of the instant invention with synthetic resin emulsions.

The dispersions of this invention efficiently impart hydrophobic characteristics to the surfaces and interfaces of substrates onto which they are applied, as well as to films cast from synthetic resin emulsions modified through blending with said dispersions. It will be obvious to those skilled in the art that many modifications can be made to the instant invention, descriptions of which were not specifically included in the preceding written disclosure, without departing from the spirit and scope of the invention as described.

What I claim is:

1. A composition of matter which is an aqueous hydrophobizing agent dispersion comprising:
   a) from about 0.01% up to about 5%, by weight based on hydrophobizing agent, of a water-soluble protective colloid,
   b) from about 0.01% up to about 99.9%, by weight based on hydrophobizing agent, of a solid water-insoluble anhydride compound,
   c) from about 0.1% up to about 60% by weight of total dispersion of a reactive hydrophobizing agent, and
   d) optionally secondary dispersion stabilizers.

2. The composition of claim 1 wherein the water-soluble protective colloid is selected from the group consisting of plant glycosides, semi-synthetic water-soluble polysaccharides, modified starches, and blends of said water-soluble protective colloids.

3. The composition of claim 2 wherein the solid water-insoluble anhydride compound is selected from the group comprising maleic anhydride copolymers, organic anhydride compounds, and adducts of maleic anhydride with olefin compounds.

4. The composition of claim 3 wherein the reactive hydrophobizing agent is selected from the group consisting of alkylketene dimers, carboxylic acid anhydrides, alkenyl-succinic anhydrides, alkylsuccinic anhydrides and blends of said reactive hydrophobizing agents with each other and with non-reactive hydrophobizing agents.

5. The composition of claim 2 wherein the reactive hydrophobizing agent is selected from the group consisting of alkylketene dimers, carboxylic acid anhydrides, alkenyl-succinic anhydrides, alkylsuccinic anhydrides and blends of said reactive hydrophobizing agents with each other and with non-reactive hydrophobizing agents.

6. The composition of claim 1 wherein the solid water-insoluble anhydride compound is selected from the group comprising maleic anhydride copolymers, organic anhydride compounds, and adducts of maleic anhydride with olefin compounds.

7. The composition of claim 6 wherein the reactive hydrophobizing agent is selected from the group consisting of alkylketene dimers, carboxylic acid anhydrides, alkenyl-succinic anhydrides, alkylsuccinic anhydrides and blends of said reactive hydrophobizing agents with each other and with non-reactive hydrophobizing agents.

8. The composition of claim 6 wherein the water-soluble protective colloid is selected from the group consisting of plant glycosides, semi-synthetic water-soluble polysaccharides, modified starches, and blends of said water-soluble protective colloids.

9. The composition of claim 1 wherein the reactive hydrophobizing agent is selected from the group consisting of alkylketene dimers, carboxylic acid anhydrides, alkenyl-succinic anhydrides, alkylsuccinic anhydrides and blends of said reactive hydrophobizing agents with each other and with non-reactive hydrophobizing agents.

10. The composition of claim 9 wherein the solid water-insoluble anhydride compound is selected from the group comprising maleic anhydride copolymers, organic anhydride compounds, and adducts of maleic anhydride with olefin compounds.

11. The composition of claim 9 wherein the water-soluble protective colloid is selected from the group consisting of plant glycosides, semi-synthetic water-soluble polysaccharides, modified starches, and blends of said water-soluble protective colloids.

12. A blend of the composition of claim 1 and a synthetic resin emulsion.

13. The blend of claim 12 wherein the water-soluble protective colloid is selected from the group consisting of plant glycosides, semi-synthetic water-soluble polysaccharides, modified starches, and blends of said water-soluble protective colloids.

14. The blend of claim 13 wherein the solid water-insoluble anhydride compound is selected from the group comprising maleic anhydride copolymers, organic anhydride compounds, and adducts of maleic anhydride with olefin compounds.

15. The blend of claim 14 wherein the reactive hydrophobizing agent is selected from the group consisting of alkylketene dimers, carboxylic acid anhydrides, alkenylsuccinic anhydrides, alkylsuccinic anhydrides and blends of said reactive hydrophobizing agents with each other and with non-reactive hydrophobizing agents.

16. The blend of claim 12 wherein the solid water-insoluble anhydride compound is selected from the group comprising maleic anhydride copolymers, organic anhydride compounds, and adducts of maleic anhydride with olefin compounds.

17. A method for producing a composition of matter which is an aqueous hydrophobizing agent dispersion comprising:
   a) from about 0.01% up to about 5%, by weight based on hydrophobizing agent, of a water-soluble protective colloid,
   b) from about 0.01% up to about 99.9%, by weight based on hydrophobizing agent, of a solid water-insoluble anhydride compound,
   c) from about 0.1% up to about 60% by weight of total dispersion of a reactive hydrophobizing agent, and
   d) optionally secondary dispersion stabilizers, comprising dispersing said hydrophobizing agent into water in the presence of said water-soluble protective colloid and solid water-insoluble anhydride compound to form the aqueous hydrophobizing agent dispersion.

18. The method of claim 17 wherein the water-soluble protective colloid is selected from the group consisting of plant glycosides, semi-synthetic water-soluble polysaccharides, modified starches, and blends of said water-soluble protective colloids.

19. The method of claim 18 wherein the solid water-insoluble anhydride compound is selected from the group comprising maleic anhydride copolymers, organic anhydride compounds, and adducts of maleic anhydride with olefin compounds.

20. The method of claim 19 wherein the reactive hydrophobizing agent is selected from the group consisting of alkylketene dimers, carboxylic acid anhydrides, alkenylsuccinic anhydrides, alkylsuccinic anhydrides and blends of said reactive hydrophobizing agents with each other and with non-reactive hydrophobizing agents.

* * * * *